United States Patent
Ganz et al.

(10) Patent No.: US 9,037,486 B2
(45) Date of Patent: May 19, 2015

(54) METHOD FOR DISABLING AND RE-ENABLING THIRD-PARTY ADS

(75) Inventors: Howard Ganz, Woodbridge (CA); Karl Joseph Borst, Toronto (CA); Jessica Boyd, Etobicoke (CA)

(73) Assignee: GANZ, Woodbridge, Ontario ( * ) Notice: Subject to any disclaimer, the term of this patent is extended or adjusted under 35 U.S.C. 154(b) by 660 days.

(21) Appl. No.: 12/414,079

(22) Filed: Mar. 30, 2009

(65) Prior Publication Data
US 2009/0254434 A1 Oct. 8, 2009

Related U.S. Application Data

(60) Provisional application No. 61/040,388, filed on Mar. 28, 2008.

(51) Int. Cl.
*A63F 13/30* (2014.01)
*G06Q 30/02* (2012.01)

(52) U.S. Cl.
CPC ........... *A63F 13/12* (2013.01); *A63F 2300/407* (2013.01); *A63F 2300/5506* (2013.01); *A63F 2300/5513* (2013.01); *A63F 2300/5546* (2013.01); *A63F 2300/69* (2013.01); *G06Q 30/02* (2013.01); *G06Q 30/0246* (2013.01); *G06Q 30/0272* (2013.01); *G06Q 30/0277* (2013.01)

(58) Field of Classification Search
CPC .................................................. G06Q 30/0272
USPC ........... 705/14, 14.68, 14.45, 17.73; 715/849; 463/29
See application file for complete search history.

(56) References Cited

U.S. PATENT DOCUMENTS

| | | | |
|---|---|---|---|
| 5,411,259 | A | 5/1995 | Pearson |
| 5,907,831 | A | 5/1999 | Lotvin et al. |
| 5,964,660 | A | 10/1999 | James et al. |
| 6,178,407 | B1 | 1/2001 | Lotvin et al. |
| 6,216,112 | B1 | 4/2001 | Fuller et al. |

(Continued)

FOREIGN PATENT DOCUMENTS

| | | |
|---|---|---|
| EP | 1217560 A1 | 6/2002 |
| GB | 2365364 | 2/2002 |

(Continued)

OTHER PUBLICATIONS

Grace, "Web Site Tycoon's Next Goal: Sixth Grade"; Woonsocket Call, Jun. 19, 2002.

(Continued)

*Primary Examiner* — Eric Netzloff
(74) *Attorney, Agent, or Firm* — Pearne & Gordon LLP

(57) ABSTRACT

A method for disabling and re-enabling third-party advertisements is disclosed. An Internet accessible "virtual world" or interactive on-line community can have its advertisements disabled by the entering and subsequent validation of a registration code that is associated with a toy into a website, once validated, displaying a virtual representation of the toy on the website, providing virtual world content so that the virtual representation of the toy is caused to interact with the virtual world content and the toy virtual representations of other users, displaying advertisement on the website in a first mode and allowing customization of the virtual world content including the disabling of advertisements in a second mode. In a similar manner the third party advertisements can be re-enabled.

15 Claims, 6 Drawing Sheets

(56) References Cited

U.S. PATENT DOCUMENTS

| | | |
|---|---|---|
| 6,267,672 B1 | 7/2001 | Vance |
| 6,343,990 B1 | 2/2002 | Rasmussen et al. |
| 6,368,177 B1 | 4/2002 | Gabai et al. |
| 6,539,400 B1 | 3/2003 | Bloomfield et al. |
| 6,616,532 B2 | 9/2003 | Albrecht |
| 6,662,231 B1 | 12/2003 | Drosset et al. |
| 6,773,325 B1 | 8/2004 | Mawle et al. |
| 6,847,992 B1 | 1/2005 | Haitsuka et al. |
| 6,910,186 B2 | 6/2005 | Kim |
| 6,954,728 B1 | 10/2005 | Kusumoto et al. |
| 7,039,940 B2 | 5/2006 | Weatherford |
| 7,094,154 B2 | 8/2006 | Kellerman et al. |
| 7,171,154 B2 | 1/2007 | Fujisawa |
| 7,203,656 B2 | 4/2007 | Lotvin et al. |
| 7,208,669 B2 | 4/2007 | Wells |
| 7,249,139 B2 | 7/2007 | Chuah et al. |
| 7,314,407 B1 | 1/2008 | Pearson |
| 7,425,169 B2 | 9/2008 | Ganz |
| 7,442,108 B2 | 10/2008 | Ganz |
| 7,465,212 B2 | 12/2008 | Ganz |
| 7,478,047 B2 | 1/2009 | Loyall et al. |
| 7,818,205 B2 | 10/2010 | Clark et al. |
| 7,848,951 B2 | 12/2010 | Lidwell et al. |
| 2002/0022992 A1 | 2/2002 | Miller et al. |
| 2002/0022993 A1 | 2/2002 | Miller et al. |
| 2002/0022994 A1 | 2/2002 | Miller et al. |
| 2002/0026357 A1 | 2/2002 | Miller et al. |
| 2002/0026358 A1 | 2/2002 | Miller et al. |
| 2002/0065746 A1 | 5/2002 | Lewis |
| 2002/0078441 A1* | 6/2002 | Drake et al. ............... 725/9 |
| 2002/0082913 A1 | 6/2002 | Li |
| 2002/0100040 A1 | 7/2002 | Bull |
| 2002/0165777 A1* | 11/2002 | Lotvin et al. ............ 705/14 |
| 2002/0198781 A1 | 12/2002 | Cobley |
| 2003/0122864 A1 | 7/2003 | Jenne et al. |
| 2004/0003398 A1 | 1/2004 | Donian et al. |
| 2004/0043806 A1 | 3/2004 | Kirby et al. |
| 2004/0093266 A1 | 5/2004 | Dohring |
| 2004/0148424 A1* | 7/2004 | Berkson et al. ............... 709/236 |
| 2004/0153635 A1* | 8/2004 | Kaushik et al. ............... 712/236 |
| 2004/0229568 A1* | 11/2004 | Lowe et al. ............... 455/66.1 |
| 2004/0242326 A1 | 12/2004 | Fujisawa et al. |
| 2004/0249712 A1 | 12/2004 | Brown et al. |
| 2005/0059483 A1* | 3/2005 | Borge ............... 463/29 |
| 2005/0192864 A1 | 9/2005 | Ganz |
| 2005/0233744 A1 | 10/2005 | Karaguz et al. |
| 2005/0250415 A1 | 11/2005 | Barthold |
| 2005/0250416 A1 | 11/2005 | Barthold |
| 2006/0093142 A1 | 5/2006 | Schneier et al. |
| 2006/0129458 A1 | 6/2006 | Maggio |
| 2006/0246970 A1 | 11/2006 | Smith et al. |
| 2007/0050716 A1 | 3/2007 | Leahy et al. |
| 2007/0105613 A1* | 5/2007 | Adams et al. ............... 463/16 |
| 2007/0110240 A1 | 5/2007 | Moskowitz et al. |
| 2007/0233562 A1 | 10/2007 | Lidwell et al. |
| 2007/0260520 A1 | 11/2007 | Jha et al. |
| 2008/0140528 A1 | 6/2008 | Ganz et al. |
| 2008/0141367 A1 | 6/2008 | Ganz et al. |
| 2008/0163055 A1 | 7/2008 | Ganz et al. |
| 2009/0063283 A1 | 3/2009 | Kusumoto et al. |

FOREIGN PATENT DOCUMENTS

| | | |
|---|---|---|
| JP | 2002063092 | 2/2002 |
| WO | 99/42917 A2 | 8/1999 |
| WO | 01/69829 A2 | 9/2001 |
| WO | 0190841 A1 | 11/2001 |

OTHER PUBLICATIONS http://web.archive.org.web.20031202190119/www.monopets.com/, Dec. 2, 2003.

* cited by examiner

METHOD FOR DISABLING AND RE-ENABLING THIRD-PARTY ADS

This application claims the benefit of the provisional application Ser. No. 61/040,388 filed on Mar. 28, 2008 incorporated herein by reference in its entirety.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by the law, but otherwise reserves all copyright rights whatsoever.

FIELD OF THE INVENTION

This application describes a method for disabling and re-enabling third-party advertisements.

More specifically, this application relates to a method for disabling and subsequently re-enabling third-party advertisements for an Internet accessible "virtual world" or interactive on-line community.

BACKGROUND OF THE INVENTION

Prior to the advent of the interactive "virtual worlds" or interactive on-line communities operable through the registration of a purchased toy on an interactive website using a registration code (U.S. Pat. Nos. 7,442,108, 7,425,169, and 7,465,212) a consumer would purchase a product, such as a toy (e.g., a stuffed plush animal or other creature, etc.) as a gift for a child, and that child then used the toy for imaginative activities. However, the product manufacturer relationship with the product did not typically continue until the next product was purchased.

This lack of continuity represented a lost opportunity to take advantage of the fact that the child or other product owner likely wants to create a whole interactive world for the product for other purposes, such as for play, collecting, etc. A means of creating a such an interactive, imaginative world using modern computer tools, such as a personal computer connected to the internet, wherein the product can be utilized in a computer generated "virtual world" for various games and activities, allows the owner a more varied and interactive means of playing with the product.

In addition, the virtual world as described therein could also be a means to generate additional revenue through the marketing of advertisement space to interested third parties. The placing of advertisements on the Internet is commonly known and propagated ubiquitously technique.

Recent developments pertaining to advertising on the Internet have been made in this field including combining interactive information services together with interactive advertising on a communications network such as the Internet and LANs wherein the information service may be an interactive game played on across a network (U.S. Pat. No. 6,183, 366). Notably, this system did not provide the end user or gamer the ability to proactively control their gaming experience by disabling the third party advertisements.

SUMMARY OF THE INVENTION

The inventors recognized that there may be uses for controlling, e.g., disabling, advertisements such as third party advertisements in the context of a virtual world.

Many have recognized that including advertisements could be used as a source of revenue. The inventors also recognized the polar opposite might be true—that use of overriding advertisements might also be used as a revenue source.

One aspect of the present invention provides a method for disabling advertisements that comprises the entering and subsequent validation of a registration code that is associated with a toy into a website, responsive to this validation a virtual representation of the toy is displayed on the website, providing virtual world content so that the virtual representation of the toy is caused to interact with the virtual world content and the toy virtual representations of other users, displaying advertisement on the website in a first mode and allowing customization of the virtual world content including the disabling of advertisements in a second mode.

Another aspect of the present invention provides a method for re-enabling third party advertisements that comprises controlling access to a website that stores a user account that was previously created through the validation of a toy registration code, responsive to the access, providing a virtual representation of the toy on the website, providing virtual world content so that the virtual representation of the toy is caused to interact with the virtual world content and the toy virtual representations of other users, receiving a request entered via the website to re-enable the presentation of the third party advertisements on the website; and responsive to receiving the request, customizing the virtual world content associated with the user account to allow presentation of the third party advertisements on the website, such that the request was entered by a user via the website by navigating to a customization screen on the website and selecting an unlock option.

DETAILED DESCRIPTION

Figure 1:
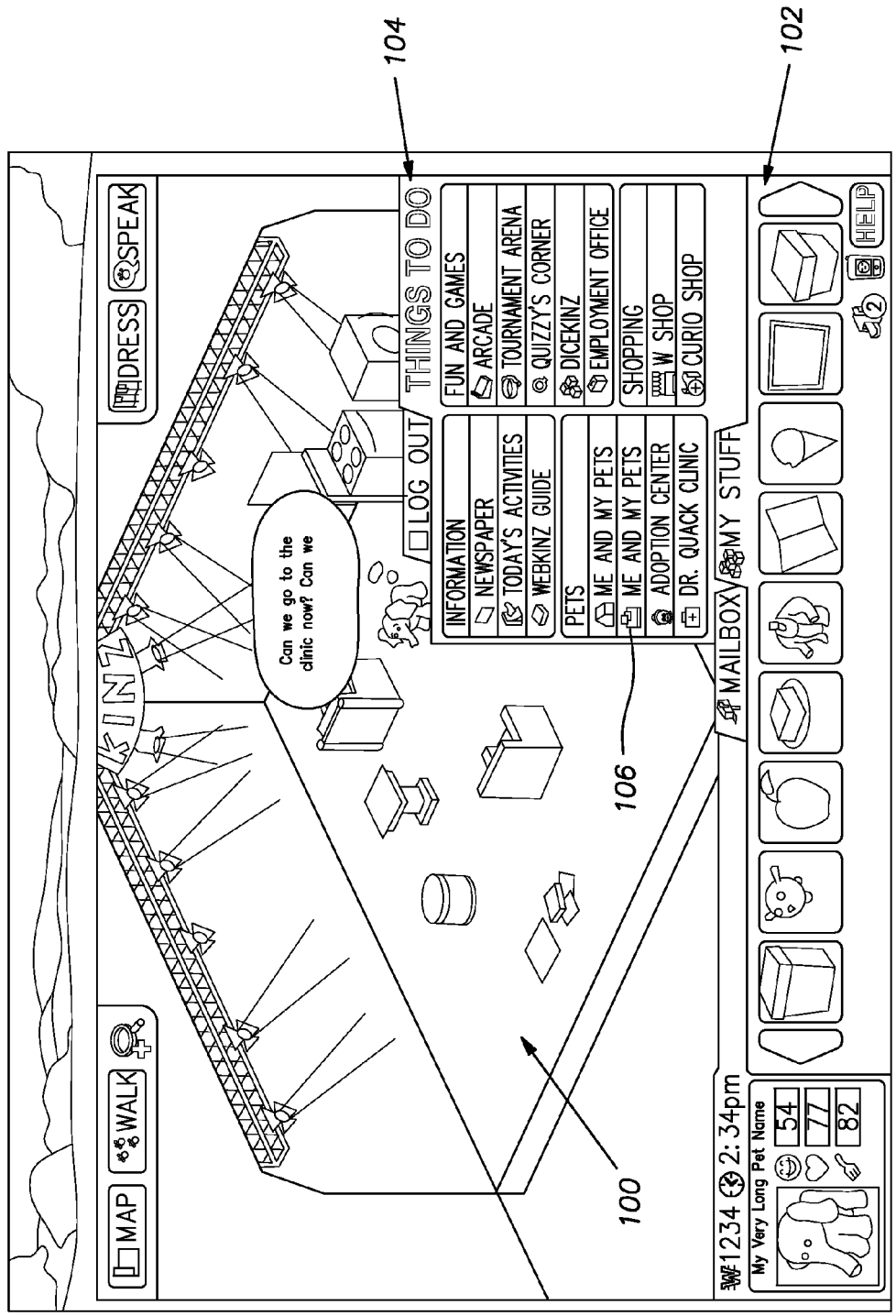
FIG. 1 illustrates an embodiment of the interactive website depicting the dock station.

Our previous issued patent applications, U.S. Pat. Nos. 7,465,212, 7,442,108 and 7,425,169 (the entire contents of which are herewith incorporated by reference) describe a system which uses a real or tangible item to present a virtual item on a website; where the real item is represented by the virtual item on the website. In that application, a tangible item is packaged with a code, and that code is later used to register the virtual item, which is a virtual representation of the tangible item, into the Internet virtual world. The website stores a user account that holds information indicative of the registered toys that have been registered in this way.

The virtual representation may be a replica of, or similar to, the actual item. Users buy items, toys for example, in a tangible form, and some aspect of the packaging of the tangible toy has a special code. The code can be entered into a website to allow the user to enter a virtual world in which they can interact with a virtual version of the toy. For example, if a user buys a toy stuffed monkey, the monkey comes with a code that allows entering the code to enter the virtual world with a virtual version of that specific monkey.

Provided is an Entertainment System including an online "virtual world" where the user of a product can register the product using a unique registration number provided with the product at purchase, where the registration number is typically hidden from view until after purchase or use of the product.

In an example embodiment, provided is an Entertainment System including an online "virtual world" where the user of a toy can register the toy using a unique registration number provided with the toy at purchase, adopt the toy online, and play with a virtual representation of the toy (the "virtual toy") in the virtual world. In some embodiments, the "virtual world" can be implemented using an interactive website via a user computer connected to the Internet. In this manner, a user can play with the virtual toy in a computer generated fantasy world (i.e., the virtual world).

The term "toy" could be any type of toy (for example, those used by a child), including, for example, plush toys (including but not limited to stuffed animals, fantasy figures, dinosaurs, vehicles, dolls, etc.), along with other types of toys (including, but not limited to, vehicles such as cars and trucks; action figures such as army figures, monsters, sports figures, fantasy figures, dinosaurs; dolls; figurines and other collectibles etc.).

Graphics, animation, sound, and recorded or live images might be utilized to generate the virtual world and virtual toy. In addition, other sources of material can also be utilized. In essence, the virtual world creates an interactive playland for the toy owner to encourage imagination using the toy, and at the same time, provide an incentive to purchase additional toys or encourage additional individuals to also purchase toys in order to participate in the Entertainment System.

Throughout this disclosure, the term "virtual" is used, for example, to describe the user viewable/hearable material presented to the user on the user computer from data and/or computer programs and commands generated and/or provided by the Entertainment System, to the user computer running one or more computer applications (e.g., a web browser with the appropriate plug-ins, applets, and/or other support programs, etc.). The System provides the data and/or programs, via a communication network connected to the System and the user computer (e.g., the Internet).

The term "virtual" does not necessarily mean that the displayed item is not "real", because the displayed item could, for example, be a video or picture of a real item, for example. Furthermore, the "virtual world" is presented using "real" physical phenomena (e.g., light and sound), and is impacted by "real" user interactions (e.g., mouse and keyboard manipulations). Rather, the term "virtual" is used to describe the computer generated and/or provided presentation to the user, including both visual and audible effects, via the user computer. It is a "virtual world" in the sense that it is primarily a computer presented fantasy world with which the user can interact via manipulations of the user computer. In this manner, the "virtual" items of the virtual world can be presented as interacting with each other and with the user.

Disabling Third Party Advertisements

Once a user is actively interacting in the virtual world, there exists an opportunity for third party advertisers who may be desirous of accessing the target audience of the virtual world to display their advertisements in a predetermined section of the virtual world. Since the users who are partaking in the virtual world experience have all purchased a physical toy with a registration code, there is a point of commonality among that group which advertisers could readily avail themselves. However, often times the user is a child. Parents who are desirous of ensuring the safety and integrity of their child's on-line interactions may be further interested in disabling any third party advertisements that their child may face. The embodiments address this by providing those interested users or parents of users with the ability to modify, e.g., disable third party advertisements.

From a high level perspective, the embodiments permit a user (or the parent of a user) who is currently interacting with the virtual representation of their toy in the previously described virtual world the ability to proactively disable any third party advertisements. On the other hand should the user (or the parent of a user) wish to enable any third party advertisements, the embodiment provides for that scenario as well.

Figure 2:
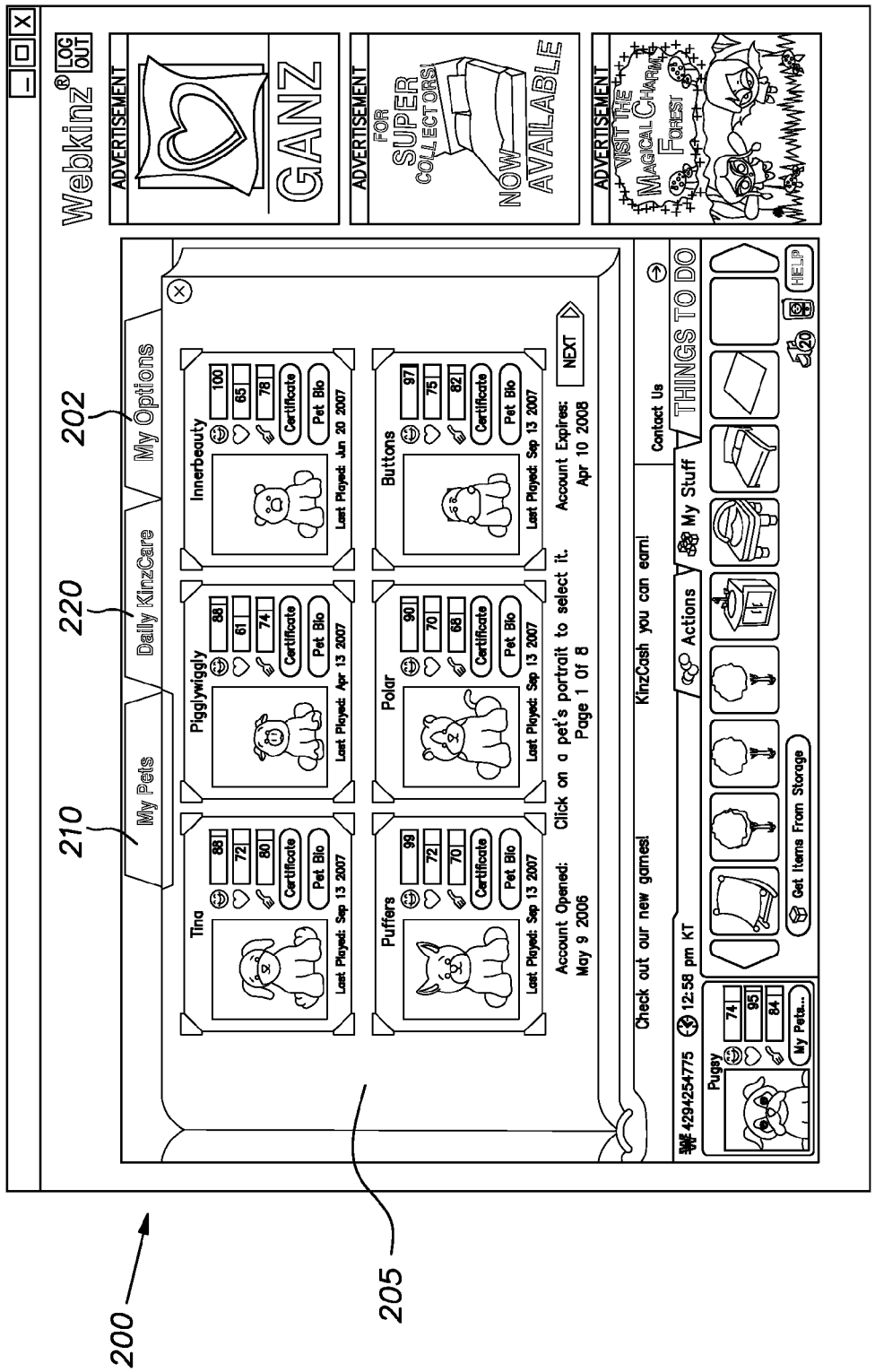
FIG. 2 illustrates an embodiment of the interactive website providing a "Me and My Pets Page".

Once the user has successfully registered their purchased toy product and has commenced interacting with the virtual world as described in the previously listed family of issued patents (U.S. Pat. Nos. 7,465,212, 7,442,108 and 7,425,169) the user or parent of the user may be interested in disabling any unwanted third party advertisement. The interactive experience is often times centered around the virtual toy product's private room 100. FIG. 1 shows an embodiment in which the user has access to a control menu from the dock 102. FIG. 1 depicts an embodiment wherein a gateway access point is accessible through the "THINGS TO DO" menu 104. One option is the submenu "ME AND MY PETS" 106 which navigates to the "ME AND MY PETS" page 200 shown in FIG. 2. This includes the ability to interact with the user's pets via tabbed pages. A first "my pets" page 205 is as shown in FIG. 2, associated with the "my pets" tab 210. A daily KinzCare tab 220 can describe the kinds of actions that should be taken to maintain and care for the virtual toy(s) associated with the user account. In the present embodiment, the user may navigate from the "ME AND MY PETS" page 200 to a subsequent menu, by selecting the "MY OPTIONS" tab 202.

Figure 3:
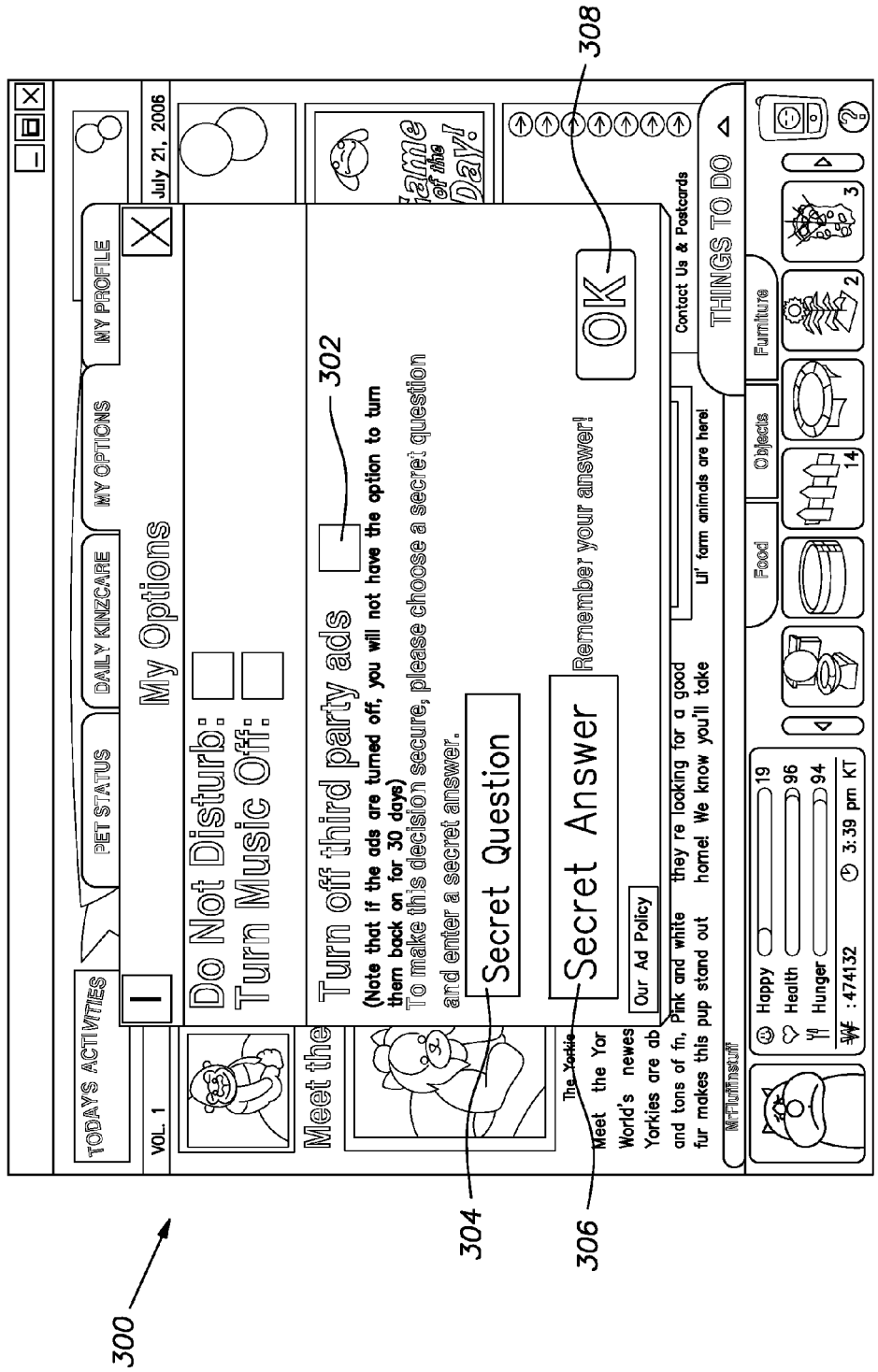
FIG. 3 illustrates an embodiment of a control screen prompting the user for a secret question/answer.

Selection of the "MY OPTIONS" tab 202 navigates the user to the "MY OPTIONS" page 300 shown in FIG. 3. The MY OPTIONS page 300 displayed in FIG. 3 includes content that appears when the third party advertisements are not already disabled. In the present embodiment, the "MY OPTIONS" page 300, provides the user (or interested parent) with the ability to disable any third party advertisements. Should the user wish to disable or "turn off third party ads", they are prompted to select the check box 302. Once that check box 302 has been selected and the user selects the OK button 308, the third party advertisements are effectively disabled and the user may then continue interacting in the virtual world without being presented with any third party advertisements.

In an alternative embodiment, after the user who is desirous of disabling third party advertisements has selected check box 302, the user receives the option to enter a secret question 304 in addition to its corresponding secret answer 306. Once the user has entered the secret question 304, the secret answer 306 and has selected the OK button 308, the third party advertisements have effectively been disabled and the corresponding check box 302 is no longer accessible and cannot be deselected.

As an addition to this alternative embodiment, the embodiment may be populated with a list of predefined secret questions such as follows:

What is your mother's maiden name?
    What was the name of your first pet?
    What was the name of your favorite teacher?
    What is your favorite flower?
    What's the name of your favorite book?

What is the name of your favorite literary character?

What is the name of the street you grew up on?

A user may select one of those predefined secret questions and respond to it with their appropriate secret answer which is stored in association with their user account.

As a further alternative to the presently described embodiment, once the third party advertisements have been disabled, internal advertisements from the virtual world hosting organization may take the place of the third party advertisements. These advertisements may optionally describe other toy offerings such as a pet of the month, related product offerings (clothing, games etc), upcoming products, upcoming events and additional games and services to which the user may avail themselves. Such internal advertisements do not originate from a third party advertiser who is unaffiliated with the virtual world hosting organization thereby limiting the user's on-line interactive experience to a reflection of the virtual world hosting organization such as WEBKINZ WORLD™.

Disabling third party advertisements prevents the third party advertisements from being displayed or otherwise presented to the user within the virtual world. Disabling third party advertisements can be specific to each individual user, account, or any other desired subset of the virtual world population. For example, when third party advertisements are disabled by, or on behalf of a particular user, when that particular visits the virtual world the particular user will not be exposed to the disabled third party advertisements. Instead, internal advertisements having content controlled and optionally pre-approved by the virtual world hosting organization, non-advertisement content, or simply an absence of content altogether can be displayed or otherwise presented in place of the third party advertisements. However, another user controlling another virtual toy in the virtual world can possibly be exposed to the third party advertisements via another user computer if third party advertisements are not disabled for the another user. The user for which third party advertisements have been disabled will not be exposed to the third party advertisements, and the another user for which third party advertisements have not been disabled can be exposed to the third party advertisements, even if both users are visiting a common room or other location within the virtual world or interacting with each other.

According to other embodiments, the status of third party advertisements (i.e., enabled or disabled) can be saved in the user account. Thus, each time the user logs back in to the virtual world via the user account the status of the third party advertisements can be maintained as the status that was active when the user last logged off of the virtual world.

In a further embodiment of the embodiment, once the user has selected the check box 302 and in turn selects the OK button 308, or alternatively should the user select the check box 302 and provide a secret question 304 and corresponding secret answer 306 and then select the OK button 308, the third party advertisements will be disabled. In one embodiment, the advertisements are turned off for a predetermined length of time (ex. 30 days, however, any time period can be used: 45 days, 60 days, 10 days or any desired length). At this point all third party advertising are in fact disabled for that predetermined length of time. In this embodiment, the user is prohibited from changing the ad status at all during that 30 day period. Instead, users see a notice to this effect when they visit the My Options page 400 shown in FIG. 4a, such as a "cannot currently be turned on" message. The duration of the time period remaining before the third party advertisements can be re-enabled can also optionally be displayed, generically appearing in FIG. 4a as "X more days."

The computer counts down the number of days the user has left until they can turn the ads back on. When the 30 days are expired, the notice will not appear and the third party ads will be able to be turned back on. The ads are not automatically turned on, but the user gets the choice to turn them on again.

In one embodiment, the ability to turn off third party ads is limited to members who have paid active accounts. Free accounts and expired accounts will not have the ability to turn the ads off. This option will be inactive for those account holders.

Figure 5:
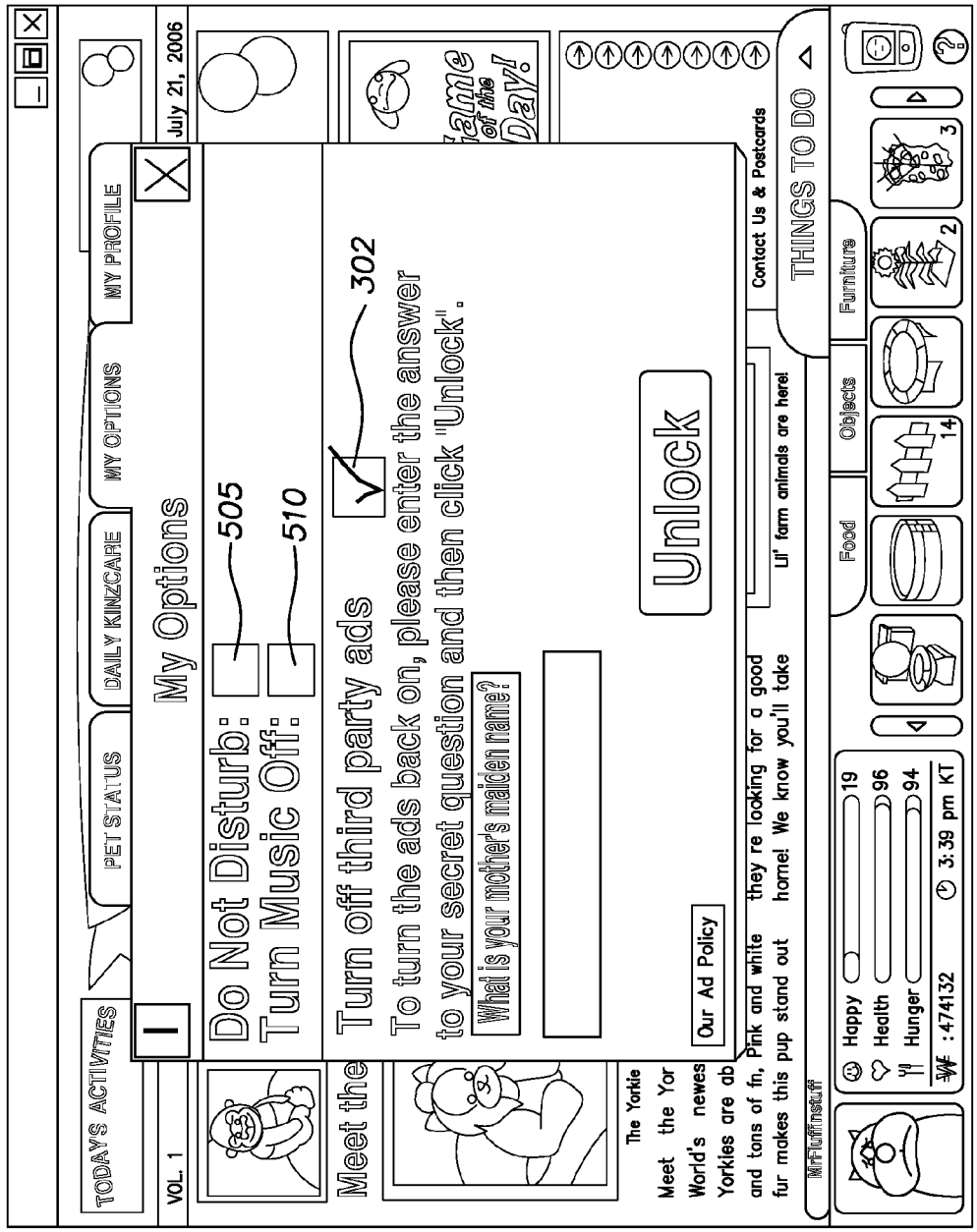
FIG. 5 illustrates an embodiment of a control screen wherein the user is prompted to answer the secret question.

Other options can also be found on the My Options page 300 in FIG. 5 include: the "Do Not Disturb" option 505, and the "Music in Games" option 510. If the "Do Not Disturb" feature is on, that means that the user cannot receive any invitations to play games in the Tournament Arena, or requests to visit another user's house or room. This can be set, for example, by a parent, to limit the user's capabilities. The user can still be in multiuse mode with this feature on; but they will not receive any invitations. The user can still send out invitations, but cannot receive any back.

If the "Music in Games" feature is turned off, the user will not hear any music in the games they play. In an embodiment, the music remains in the user's chosen state (on or off) until changed by the user. It does not return to default between sessions.

In one embodiment, the internal representation of the user's account and their desire to view or not view third party advertisements may be accomplished through the use of a bitwise flag variable. That variable can be a flag that is set to "0" to indicate that the user can view third party advertisements (i.e., third party advertisements have not been disabled for the user).

From the perspective of the virtual world hosting organization, a report may be generated for audit purposes which canvasses user's accounts and counts the number corresponding bitwise flag variables that are set to "0". This in turn signifies the number of registered users who are currently set to view third party advertisements. This information may be of interest to potential third party advertisers who wish to enter a business relationship with the virtual world hosting organization.

Enabling Third Party Advertisements

Figure 4A:
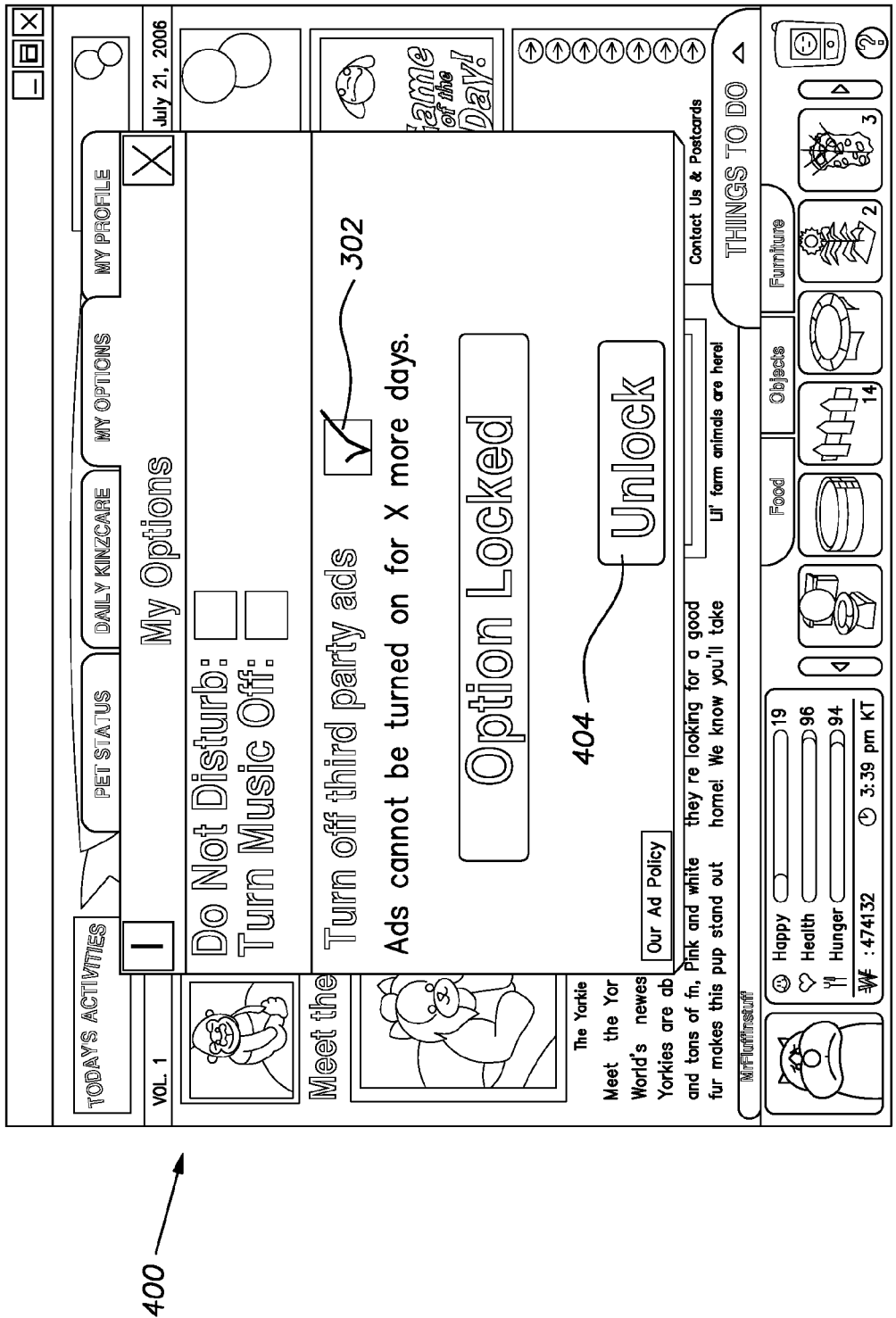
FIG. 4*a* illustrates an embodiment of a MY OPTIONS page for enabling third party advertisements that have been disabled without a secret question/secret answer.
Figure 4B:
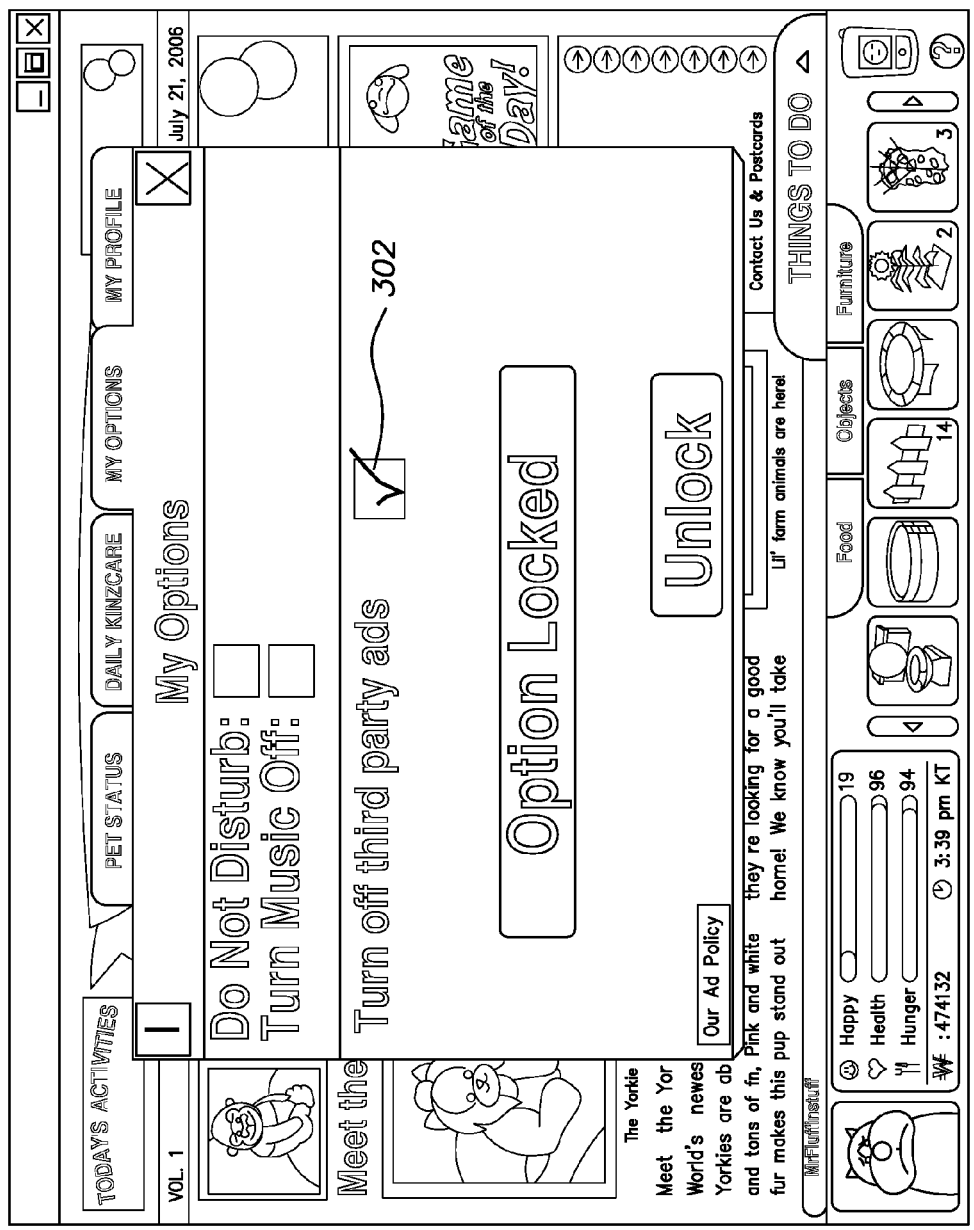
FIG. 4*b* illustrates an embodiment of a MY OPTIONS page for enabling third party advertisements that have been disabled with a secret question/secret answer.

FIGS. 4a and 4b illustrate examples of the MY OPTIONS pages 400, 402 for enabling third party advertisements. FIG. 4a illustrates a scenario where third party advertisements were disabled without the use of a secret question 304 or secret answer 306. In FIG. 4a, however, the third party advertisements were disabled for a predetermined period of time, that will not expire for X more days. As such, the check box 302 is "grayed out", preventing the user from un-checking the check box 302 until the full period has expired. FIG. 4b illustrates the scenario wherein third party advertisements were disabled using both a secret question 304 (FIG. 3) and a secret answer 306.

As discussed, the user or the parent of the user can disable third party advertisements in one of the previously described manners disclosed herein. Once that is done, they can reactivate or enable third party advertisements, by re-navigating themselves to the "MY OPTIONS" page 300.

If the user deactivated third party advertisements without a secret question 304 or secret answer 306, as illustrated by FIG. 4a, and after the predetermined period of time has expired (or if no predetermined period of time has been set), then in order to activate third party advertisements they would be required to select the Unlock button 404 and subsequently deselect the check box 302.

In the alternative, if the user deactivated third party advertisements with a secret question 304 or secret answer 306, as illustrated by FIG. 4b, then in order to activate third party advertisements they would be required to select the Unlock button 404. Subsequently, the user is then navigated to a screen as depicted by FIG. 5. Once the user of the interested parent is directed to the screen captured by FIG. 5, third party advertisements will not be reactivated until the user correctly responds to the previously set secret question 304 with the secret answer 306. Once the user responds correctly with the secret answer 306, the check box 302 becomes reactivated and should the user wish to be presented with third party advertisements, they may choose to deselect check box 302.

It should be further appreciated that if the system is operable to deactivate third party advertisements using a pre-determined amount of time, then the user may not be permitted to reactivate the third party advertisements until said pre-determined amount of time has in fact elapsed.

An embodiment also adds automated support for customer service for these features. Sample questions and answers follow.

How do I turn off third party advertising?
Hi, thanks for writing to us.
To turn off third party advertising, just go to the "Me and My Pets" section in the "Things to do" menu and click on "My Options." You'll see a checkbox. Click on it to check it off.
If you want to secure your decision, choose a secret question and create an answer. If you ever want to turn the third party ads back on, just click "Unlock". If you created an answer initially, you'll be prompted to re-enter it.
Thanks again for writing to us,
Your furry friends at Webkinz World
Why can't I turn the ads back on?
Hi, thanks for writing to us.
When you turn off ads in Webkinz World, they will remain turned off for 30 days. At the end of 30 days, you can turn the ads back on if you like.
Thanks again for writing to us,
Your furry friends at Webkinz World
How do I turn the music back on in my games?
Hi, thanks for writing to us.
If you turned the music in your games off, just click on the "My Options" section of the "Me and My Pets" section. Click the checkbox next to "Turn Music Off". When the box has no checkmark in it, the music is on.
Thanks again for writing to us,
Your furry friends at Webkinz World
How do I turn the "Do Not Disturb" feature off?
Hi, thanks for writing to us.
If you turned the "Do Not Disturb" feature on, just click on the "My Options" section of the "Me and My Pets" section. Click the checkbox next to "Do Not Disturb". When the box has no checkmark in it, you'll be able to receive invitations to play games and visit your friends' houses again.
Thanks again for writing to us,
Your furry friends at Webkinz World The embodiments have been described hereinabove using specific examples; however, it will be understood by those skilled in the art that various alternatives may be used and equivalents may be substituted for elements or steps described herein, without deviating from the scope of the invention. Modifications may be provided to adapt the invention to a particular situation or to particular needs without departing from the scope of the invention. It is intended that the invention not be limited to the particular implementation described herein, but that the claims be given their broadest interpretation to cover all embodiments, literal or equivalent, covered thereby.

The invention claimed is:

1. A method for disabling advertisements comprising:
   a. using a networked computer system, entering a registration code associated with a toy into a website, and receiving a validation from a user computer, said registration code having been submitted by a user via the user computer to be validated;
   b. subsequent to successful validation of the registration code, displaying a virtual representation of the toy in a first region on the website, using the user computer;
   c. interacting the virtual representation of the toy with a virtual object associated with virtual world content within the first region on the website and with toy virtual representations associated with and controlled by other users over a communications network on said website;
   d. in a first mode, displaying advertisements in an advertisement region outside of the first region on said website using said user computer; and
   e. entering instructions for customization of said website using a customization screen that is displayed by said user computer, wherein said customization screen receives an instruction from the user computer that sets a second mode that disables third party advertisements that advertise third parties that are not part of the website and are unaffiliated with the virtual world content for the first region on the website and substitutes other content for said third party advertisements on the website, said other content comprising native advertisement that include content native to the website, related to the virtual world content and not advertising said third parties, said content native to the website being controlled by a hosting entity affiliated with the virtual world to expose a member of the website to the third party advertisements in the second mode.

2. The method of claim 1 further comprising protecting the setting of the second mode for disabling of the third party advertisements using a secret question and secret answer combination.

3. The method of claim 1 wherein said second mode for the disabling of the third party advertisements is set for a fixed time interval, and further comprising preventing re-enabling of the third party advertisements until said fixed time interval has elapsed.

4. The method of claim 1 wherein said website allows paid and unpaid users, and said second mode of disabling is only available to said paid users.

5. A method for re-enabling third party advertisements comprising:
   a. with a network computer system, controlling access to a website at which a user account is stored, said user account created by a previously validated registration code associated with a toy;
   b. responsive to granting access to the website, using the network computer system to provide a virtual representation of the toy within a first region on the website;
   c. with a network computer system, providing virtual world content for the first region in a manner that the virtual representation of the toy interacts with the virtual world content and with the toy virtual representations of other users in the first region;
   d. receiving a request entered via the website and transmitted over a communication network to re-enable presentation of the third party advertisements within an advertisement region on the website outside the first region and expose a member of the website to the third party advertisements; and e. responsive to receiving the request including the third party advertisement on the website in place of native advertisements that include content native to the website advertising a hosting entity that is responsible for content appearing in the first region of the website and no not advertise said third parties that are included on the website, but are independent of, and unaffiliated with the hosting entity, when the third party advertisements are disabled, where the request was entered by a user via the website by navigating to a customization screen on the website and selecting an unlock option, and the content native to the website is controlled by the hosting entity responsible for the virtual world.

6. The method of claim 5 further comprising requiring the deselecting of a disable third party advertisements option.

7. The method of claim 5 further comprising initially disabling third party advertisements using a secret question and secret answer combination, and requiring properly responding to the secret question with the correct secret answer in order to deselect a disable third party advertisements option.

8. The method of claim 5 wherein the user is not permitted to deselect a disable third party advertisements option until a fixed time period has elapsed.

9. The method of claim 7 wherein the user is not permitted to deselect a disable third party advertisements option until a fixed time period has elapsed.

10. The method of claim 5 wherein the virtual world content customized in response to receiving the request is stored in the user account to indicate that third party advertisements are enabled when access is subsequently granted to the website.

11. A method for disabling and re-enabling third party advertisements comprising:

a. using a network computer system receiving and validating a registration code associated with a toy to allow users to participate in an activity on a website, b. subsequent to said validating the registration code, transmitting content over a communications network to be used for displaying a virtual representation of the toy within a first region on the website;

c. transmitting virtual world content for the first region over the communication network in a manner so that the virtual representation of the toy interacts with a virtual object associated with the virtual world content in the first region on the website and with toy virtual representations of other users;

d. transmitting an instruction over then communication network that causes a user computer to display advertisements in a first mode within an advertisement region on said website, wherein in said first mode the advertisements include third party advertisements that advertise third parties that are not part of the website and are unaffiliated with the virtual world content for the first region on the website, thereby causing a member of the website to be exposed to third party advertisements;

e. receiving over the communications network a user request entered using a customization screen displayed by said user computer to display said advertisements in a second mode that disables said advertisements including third party advertisements and in place of said third party advertisements, includes native advertisements that are native to the website, related to the virtual world content and no not advertise third parties to prevent a member of the website from being exposed to the third party advertisements in the second mode; and f. responsive to receiving said user request, updating the user account to re-enable presentation of the third party advertisements in the first mode allowing the third party advertisements on the website, after said advertisements were disabled in said second mode, wherein the user request was entered by a user via the website by navigating to a customization screen on the website and selecting an unlock option.

12. A method for disabling and re-enabling third party advertisements comprising:

a. using a networked computer system, entering a registration code associated with a toy into a website, said registration code having been submitted by a user via a user computer to be validated;

b. subsequent to successful validation of the registration code, displaying a virtual representation of the toy on the website using the user computer;

c. interacting the virtual representation of the toy with virtual world content on the website and with toy virtual representations associated with and controlled by other users over a communication network on said website;

d. in a first mode, displaying advertisements on said website using said user computer;

e. entering an instruction for customization of said website using a customization screen that is displayed by said user computer, wherein said customization screen allows setting a second mode that disables third party advertisements included in said advertisements, f. wherein said third party advertisements advertise third parties that are not part of the website and said second mode that disables said advertisements is set for a fixed time interval; preventing re-enabling of the third party advertisements until said fixed time interval has elapsed.

13. A method for disabling advertisements comprising:

a. using a networked computer system, receiving and validating a registration code associated with a toy to allow a user to participate in an activity on a website, said registration code having been entered by a user into a user computer and transmitted over a communication network;

b. subsequent to said validating the registration code, transmitting content over the communication network to be used by the user computer for displaying a virtual representation of the toy within a first region on the website;

c. transmitting virtual world content over the communication network to cause an interaction between the virtual representation of the toy and both a virtual object within the first region on the website associated with the virtual world content and with toy virtual representations associated with and controlled on the website by other users over the communication network;

d. transmitting an instruction over the communication network that causes the user computer to display advertisements in a first mode within an advertisement region on said website outside of the first region, wherein in said first mode the advertisements include third party advertisements that advertise third parties that are not affiliated with the website and are unaffiliated with the virtual world content for the first region on the website, thereby exposing a member of the website to the third party advertisements in the first mode; and e. in response to receiving a user request entered by said user into a customization screen displayed by said user computer and transmitted over the communication network, transmitting another instruction over the communication network that causes the user computer to display said advertisements in a second mode in the advertisement region where said third party advertisements are disabled and other content is substituted for said third party advertisements, said other content being content native to the website and not advertising said third parties wherein the content native to the website is controlled by a hosting entity affiliated with the virtual world content and prevents the member of the website from being exposed to the third party advertisements in the second mode.

14. The method of claim 13 wherein said second mode that disables said advertisements results in an internal bit flag variable being associated with a user.

15. The method of claim 14 further comprising generating a report by canvassing the internal bit flag of the user indicating a number of users in the virtual world capable of viewing third party advertisements.

* * * * *